Figures 1, 2:
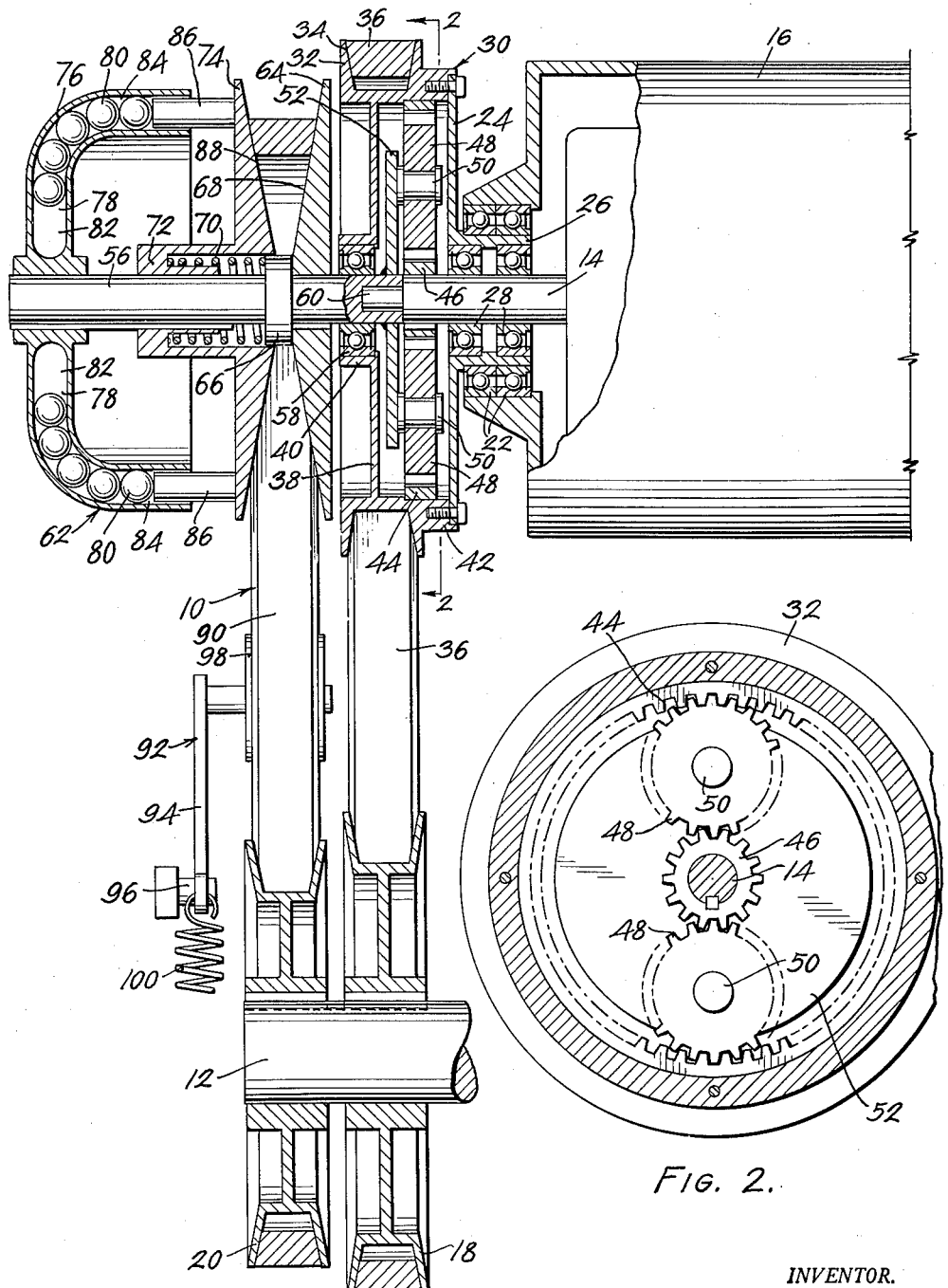

INVENTOR.
CHARLES H. MINER
BY
ATTORNEYS

United States Patent Office 2,974,544
Patented Mar. 14, 1961

2,974,544

AUTOMATIC SPEED REGULATOR

Charles H. Miner, 581 S. Downing St., Denver, Colo., assignor of one-fourth to Edwin L. Spangler, Jr., Denver, Colo.

Filed Dec. 5, 1958, Ser. No. 778,380

10 Claims. (Cl. 74—689)

This invention relates to speed regulating mechanisms and, more specifically, to automatic speed regulators of a type particularly suited for use in driving a 60 cycle, 110 volt alternating current generator at a relatively constant speed by means of a variable speed internal combustion engine.

For many years attempts have been made to drive any one of a number of different constant speed mechanisms such as generators, compressors, etc., with a variable speed power source consisting of an internal combustion engine. Automobile and truck refrigeration units along with a wide variety of conventional alternating current electrical accessories could advantageously be driven directly from an internal combustion engine operating at varying speeds and considerable time and expense have been directed to a solution of this problem.

To begin with, speed regulating devices for this general purpose are not unknown in the art and many are widely used in specific applications; however, it would be well to point out at this point a few of the more significant limitations of the prior art mechanisms. Basically, there are four major problems that must be solved in order to provide a device capable of functioning satisfactorily over the entire speed range of an internal combustion engine and, although each of these problems can be solved by itself rather easily, the solution has an adverse effect on one or more of the others. In order of importance these specific problems can be identified as follows: change in ratio, self-regulation, size and cost.

First, the problem of change in ratio should be considered. Ordinarily, an automobile engine can be expected to operate over a range of approximately 500 r.p.m. to 5000 r.p.m. which, of course, requires that the speed regulating mechanism be capable of a change in ratio of at least 10 to 1 and sometimes 12 to 1 or more. Belt-driven transmissions including a centrifugally-operated pulley and a torque-responsive pulley are available at a nominal cost and which are reasonably compact that will provide a 4 to 1 change in ratio automatically. However, when these units are enlarged to the size required to give a 10 to 1 change in ratio, they become much too expensive and are incapable of being fitted into the restricted space beneath the hood of an automobile or truck. Also, even a 10 to 1 change in ratio is exceedingly difficult to attain by means of the aforementioned transmission.

Now, with regard to the self-regulatory aspect of the apparatus, this is absolutely necessary for a unit which is to be used in an automotive vehicle and which derives its power from an internal combustion engine that is constantly changing speed while it travels along the highway. Several speed regulating devices are presently available which are compact and relatively inexpensive while providing a reasonable change in ratio; however, they are not fully automatic and require some degree of manual adjustment that prohibits their use for this purpose.

The last two factors, namely, size and cost, are likewise determinative of the utility of speed regulation units primarily designed for use in automotive vehicles. Some units are presently manufactured, for example, that are specially fabricated for aircraft; but, these devices are extremely complex and expensive which renders them prohibitive for use in a car or truck even though they would, perhaps, perform the desired function. Others are used on railroad cars and are so large as to be utterly impractical for an automobile while generally failing to provide the required change in ratio.

It is, therefore, the principal object of the present invention to provide a novel and improved speed regulator of a type particularly suited for use in automotive vehicles including trucks.

A second object is the provision of a speed regulator of the class described which is capable of a much greater change in ratio than was heretofore considered possible with a small mechanism.

A third objective of the invention is the provision of a speed regulating device that is fully automatic in operation.

Another of the objects of the instant invention is the provision of speed regulating means which is extremely compact and, therefore, ideally suited for use inside the hood of an automotive vehicle.

Still another objective is to provide speed regulating apparatus that is relatively inexpensive, yet, which can be used for driving a 60 cycle alternating current generator at a substantially constant speed well within the prescribed overload-underload limits by means of a power source such as an internal combustion engine that varies in speed between 400 r.p.m. to over 6000 r.p.m. or more.

Additional objects are to provide a speed regulating unit which is compact, extremely versatile, rugged, easy to service, simple and one that is adaptable for use in driving a wide variety of accessories at a constant speed from a variable speed power source or vice versa.

Other objects will be in part apparent and in part pointed out specifically hereinafter in connection with the description of the drawing that follows, and in which:

Figure 1 is a side elevation, portions of which have been broken away and indicated in section, showing the speed regulating device of the present invention connected between the armature shaft of a generator and the crankshaft of an internal combustion engine or other variable speed power source; and, Figure 2 is a section taken along line 2—2 of Figure 1 showing the planetary gear element of the assembly, portions thereof having been broken away to conserve space.

Referring now to the drawing and in particular to Figure 1 thereof, it will be seen that the speed regulator of the present invention, indicated generally by numeral 10, has been illustrated as forming the operative connection between a variable speed shaft 12 such as a crankshaft of an internal combustion engine in an automotive vehicle and a constant speed shaft 14 that in this particular embodiment constitutes the armature shaft of a 60 cycle, 110 volt alternating current generator 16. Two conventional V-belt pulleys 18 and 20 are keyed or otherwise mounted on the variable speed shaft 12 for conjoint rotation therewith in side-by-side relation.

The generator housing includes an annular boss on one end which has a cylindrical opening therethrough in which are mounted a pair of sealed anti-friction bearings 22. An endplate 24 having a tubular hub portion 26 journalled for rotation within bearings 22 is mounted on the end of the generator housing. A second pair of sealed anti-friction bearings 28 is mounted inside the tubular hub portion of the endplate to receive shaft 14 for rotational movement relative to both the endplate and generator housing.

Endplate 24 comprises an element of a planetary assembly which has been indicated broadly by numeral 30. This planetary assembly includes a pulley element 32 bolted or otherwise attached to endplate 24 for conjoint rotational movement. The periphery of pulley element 32 is formed to provide a V-belt groove 34 that receives V-belt 36 which forms an operative or driving connection between pulley 18 and the planetary assembly 30. Integral web 38 including tubular hub-portion 40 also comprises a part of pulley element 32 and lies in axially spaced but substantially parallel relation to endplate 24 defining therewith a gear housing 42. An internal gear 44 of the planetary assembly is attached inside pulley element 32 for conjoint rotation therewith and is located within gear housing 42 between endplate 24 and web 38. Spur gear 46 of the assembly is keyed to constant speed shaft 14 in annularly spaced relation inside internal gear 44. At least two equi-angularly spaced pinions 48 form an operative connection between the internal gear 44 and spur gear 46. These pinions are mounted for rotation on stub shafts 50 affixed to the face of a disk 52 that is welded or otherwise permanently attached to centrifugal pulley shaft 56. This last-mentioned pulley shaft 56 is journalled within sealed roller bearing 58 mounted inside the tubular hub portion 40 of pulley element 32. Shafts 56 and 14 are arranged in axial alignment with one another and their adjacent ends are joined together by means of a pin and socket connection 60 that provides for relative rotational movement therebetween.

The centrifugal pulley element, designated generally by numeral 62, and which is described in detail in my United States Patent 2,612,055, includes shaft 56 to which is immovably attached fixed flange 64. A collar 66 is mounted on shaft 56 adjacent the conical face 68 of the fixed flange and forms an abutment for one end of compression spring 70. The other end of the compression spring bottoms in the hollow hub portion 72 of movable flange 74 of the centrifugal pulley that is keyed to shaft 56 for axial slidable movement relative to the fixed flange. Also connected to shaft 56 for conjoint rotation therewith is a generally cup-shaped ball housing 76 that includes at least two equi-angularly spaced L-shaped ball tracks 78 which contain a plurality of balls 80 for rolling movement therein. These ball tracks 78 each include a radial leg 82 and an axial leg 84 which opens onto the outside of movable pulley flange 74. Pins 86 attached to the outside face of the movable pulley flange extend into the axial legs 84 of tracks 78 for relative movement therein. As the rotational speed of the centrifugal pulley increases, the balls roll in the tracks from the radial legs into the axial legs under the influence of centrifugal forces exerted thereon and press against the pins to shift the movable flange toward the fixed flange against the action of the compression spring. This, of course, closes the conical faces 88 and 68 of the flanges and increases the effective diameter of the centrifugal pulley which is operatively connected to pulley 20 by a second V-belt 90. Obviously, as the effective diameter of the centrifugal pulley 62 decreases when it slows down and the compression spring overcomes the force exerted on the pins by the balls to spread the flanges, the V-belt 90 will slacken because pulley 20 is of constant diameter; therefore, belt-tightening means indicated broadly at 92 is interposed between pulleys 20 and 62 acting against belt 90.

As shown, this belt-tightening means comprises a bell crank 94 mounted for pivotal movement on a fixed pivot 96. One leg of the crank is provided with an idler 98 mounted for rotational movement thereon and against the belt 90 while the other leg is spring-biased by tension spring 100 to hold the idler against the belt in the well known manner.

Now, with reference to both figures of the drawing, it will first be seen that all of the three shafts 12, 14 and 56 may be rotating at different speeds. For purposes of illustration, certain somewhat arbitrary sizes will be assigned to the various elements of the assembly although it is to be clearly understood that these values are merely selected as examples and, therefore, they are not those that will necessarily be used in actual practice of the invention. To begin with, the generator 16 will be considered of the four-pole, 60 cycle, 110 volt alternating current type designed to operate at a more or less constant speed of 1800 r.p.m. Pulley 18 and pulley element 32 could have a constant effective diameter of 5 inches, pulley 20 one of 4 inches and the centrifugal pulley a variable effective diameter of between approximately 2 and 5 inches. Similarly, internal gear 44 may have an inside diameter of 5 inches, the pinions 48 an outside diameter of 2 inches, and the spur gear an outside diameter of one inch. Finally, assume that shaft 12 idles at a speed of 400 r.p.m. and has a maximum speed of 6000 r.p.m. requiring that the speed regulator of the present invention provide a change in ratio of 15 to 1 in order that shaft 14 can turn at a constant speed of 180 r.p.m.

In the interests of simplicity, first consider that shaft 12 is turning at 1800 r.p.m. which means, of course, that elements 18, 20, 32 and 44 also rotate at this same speed because pulley 18 and pulley element 32 have the same constant effective diameter. Now, centrifugal pulley 62 can easily be designed so that the centrifugal force exerted by the balls 80 remaining in the radial leg 82 of the ball tracks 78 exert sufficient force on pins 86 to shift the movable flange toward the fixed flange against the action of compression spring 70 and belt-tightener 92 to provide it with an effective diameter of 4 inches at a speed of about 1800 r.p.m. Thus, shafts 12 and 56 are both turning at the same speed. This means that disk 52 will be turning at the same speed as internal gear 44 and that there will be no rotational movement of the pinions. Accordingly, spur gear 46 will turn shaft 14 at the desired speed of 1800 r.p.m.

Secondly, assume shaft 12 has slowed down to the idling speed of the engine, namely, 400 r.p.m. Here again, elements 18, 20, 32 and 44 will also turn at 400 r.p.m. Then, assume that centrifugal pulley 62 is also preset so that spring 70 and belt-tightener 92 cooperate to overcome the centrifugal force exerted by the balls in the radial legs of the tracks at rotational speeds of about 650 r.p.m. or less thereby spreading the flanges fully apart and reducing the effective diameter thereof to approximately 2½ inches. With the effective diameter of the centrifugal pulley reduced to 2½ inches, the ratio between it and pulley 20 will be about 5 to 8. Thus, shaft 56 will turn almost 1⅗ times as fast as shaft 12 or nearly 640 r.p.m. when shaft 12 is idling at 400 r.p.m. When shaft 56 and disk 52 are turning at 640 r.p.m. and internal gear 44 is only turning at the idling speed of 400 r.p.m., the differential speed therebetween will obviously be 240 r.p.m. The ratio between the internal gear 44 and the pinions 48 is 5 to 2 which means that at a differential speed of 240 r.p.m. between the internal gear 44 and disk 52, gear 44 will turn the pinions at 600 r.p.m. The spur gear 46, on the other hand, is one-half the diameter of the pinions which, therefore, will turn it 1200 r.p.m. Disk 52 which carries the pinions is also turning at 640 r.p.m. and its speed plus the rotational speed of the pinions, 1200 r.p.m., add up to approximately the desired constant speed of 1800 r.p.m. for the spur gear and shaft 14 even through shaft 12 is only turning 400 r.p.m.

Finally, consider the system when shaft 12 is turning at its maximum speed of 6000 r.p.m. As before, elements 18, 20, 32 and 44 also turn at 6000 r.p.m. Now, the number and weight of balls 80 in each track would be selected such that the centrifugal force exerted thereby would completely close the flanges to provide an effective diameter of about 4½ inches corresponding to a speed of 5300 r.p.m. when pulley 20 is being turned at 6000 r.p.m. This means that disk 52 is turning 700 r.p.m. slower than internal gear 44 which, in accordance with the 5 to 2 ratio between the internal gear and pinions, causes the pinions to rotate at a speed of 1750 r.p.m. in the reverse direction. Now, the spur gear is one-half the diameter of the pinions and will turn forward at the speed of the disk 5300 r.p.m., less twice the speed of the pinions which are turning in reverse at 1750 r.p.m. giving a net resultant forward speed of 1800 r.p.m.

It is well known that variations in armature speed of even several hundred r.p.m. are not critical especially in an automotive generator where the accessories will generally operate satisfactorily within a range of 50 to 70 cycles. The main variable in the speed regulator of the present invention is the centrifugal pulley 62 and its characteristics over the desired range of variable input speeds to produce a reasonably constant output speed can easily be calculated from the known information about the system. For instance, the speeds of the centrifugal pulley 62 and the effective diameters corresponding thereto at the various speeds of the drive shaft 12 used in the above examples were calculated from the following type formula for the system where "$d$" is the diameter of the various gear and pulley elements in inches and "$s$" is the speed thereof and of the shafts in r.p.m. with appropriate reference character subscripts being added thereto to identify the specific element:

$$\frac{d_{44}}{d_{46}} \frac{d_{42}}{d_{48}} \left( \frac{s_{12}d_{20}}{d_{62}} - \frac{s_{12}d_{18}}{d_{34}} \right) + \frac{s_{12}d_{20}}{d_{62}} = s_{14}$$

$$\frac{5}{1}\left( \frac{400 \times 4}{d_{62}} - \frac{400 \times 4}{5} \right) + \frac{400 \times 4}{d_{62}} = 1800$$

$$\frac{8000}{d_{62}} - \frac{2000}{1} + \frac{1600}{d_{62}} = 1800$$

$$d_{62} = \frac{9600}{3800} = 2.53 \text{ inches}$$

and, $$s_{56} = \frac{s_{12}d_{20}}{d_{62}} = \frac{400 \times 4}{2.53} = 633 \text{ r.p.m.}$$

Thus, when $s_{12}=400$ r.p.m., $s_{56}=633$ r.p.m. and $d_{62}=2.53$ inches to give an output speed $s_{14}$ of 1800 r.p.m. Now, when $s_{12}$ is maximum or 6000 r.p.m.:

$$5\left( \frac{6000 \times 4}{d_{62}} - \frac{6000}{1} \right) + \frac{6000 \times 4}{d_{62}} = 1800$$

$$\frac{120,000}{d_{62}} - 30,000 + \frac{24,000}{d_{62}} = 1800$$

$$d_{62} = \frac{144,000}{31,800} = 4.53 \text{ inches}$$

and, $$s_{56} = \frac{6000 \times 4}{4.53} = 5300 \text{ r.p.m.}$$

Thus, the required change in ratio of the centrifugal pulley across its entire range to accomplish the desired speed regulation of the generator driven by an internal combustion engine operating at between 400 and 6000 r.p.m. is only 4.5/2.5 or slightly less than 1.8 to 1.

Now, although the instant invention has been illustrated and described in its application as an automatic speed regulator for an alternating current generator driven from an automobile engine, it is to be clearly understood that it is by no means limited to this use and would function equally as well for many other purposes including that of a transmission wherein the drive shaft would be the constant speed shaft and the driven shaft the variable one. Also, the centrifugal pulley shown herein comprises but one of the many centrifugally-operated mechanisms that could be used; and, where even greater changes in ratio are required than are possible to achieve with this apparatus, a second variable pitch pulley, particularly of the torque-responsive type, could be substituted for the conventional pulley 20. In this same connection, pulleys 20 and 64 can, of course, be reversed and still perform their same functions. Finally, any one of the three elements 44, 52 and 46 of the planetary assembly could be connected to the constant speed shaft 14 while either of the remaining two are connected to shafts 56 and 12 without changing the overall function of the unit, it being obvious that the size ratios of the various elements would have to be changed accordingly.

Therefore, although only a single specific embodiment of my invention has been illustrated and described herein, I realize that many changes and modifications therein may occur to others skilled in the art within the broad teaching hereof; hence, it is my intention that the scope of protection afforded hereby shall be limited only insofar as said limitations are expressly set forth in the appended claims.

What is claimed is:

1. In combination, a first variable speed shaft, a second shaft journalled for rotation in spaced substantially parallel relation to the first shaft, a third shaft journalled for rotation relative to the second shaft in substantially coaxial relation thereto, means operatively interconnecting the first and second shafts comprising a V-belt and first and second V-belt pulleys, at least one of said first and second V-belt pulleys being of the self-adjusting variable pitch type and directly responsive to changes in speed of the first shaft, means operatively interconnecting the third shaft with the first and second shafts comprising a belt, a third pulley and a three element transmission, said third pulley being mounted on the first shaft, the first element of said transmission being mounted on the third shaft for rotation therewith, the second element of said transmission depending from the second shaft for rotation therewith and being operatively connected to said first element, and the third element of said transmission being operatively connected to said second element and to said third pulley by means of said belt for rotation therewith.

2. The combination as set forth in claim 1 in which the three element transmission comprises a planetary gear assembly including as the first, second and third elements a spur gear, an internal gear and at least one pinion gear operatively interconnecting the spur and internal gears.

3. The combination as set forth in claim 1 in which the first element comprises a spur gear, and the second element comprises at least one pinion depending from the second shaft for rotational movement around the periphery of the spur gear in meshed relation therewith.

4. The combination as set forth in claim 1 in which the first pulley comprises a centrifugally operated variable pitch belt pulley.

5. The combination as set forth in claim 1 in which the second pulley comprises a fixed pitch pulley, and belt-tightening means are provided in engagement with the V-belt operative to take up slack therein as the pitch diameter of the first pulley varies.

6. The combination as set forth in claim 2 in which the first element is the spur gear, the second element is the pinion gear and the third element is the internal gear.

7. In combination, first and second shafts journalled for rotation in spaced substantially parallel relation, a third shaft journalled for rotation relative to the second shaft in substantially coaxial relation thereto, means operatively interconnecting the first and second shafts comprising a V-belt and first and second V-belt pulleys, at least one of said first and second V-belt pulleys being of the self-adjusting variable pitch type, means operatively interconnecting the third shaft with the first and second shafts comprising a belt, a third pulley and a planetary gear assembly including a spur gear, an internal gear and at least one pinion gear, the spur gear being mounted on the third shaft for rotation therewith, the pinion gear depending from the second shaft for movement therewith and in meshed relation to the spur gear around the periphery thereof, and the internal gear being meshed with the pinion on the opposite side thereof from the spur gear and operatively connected to the third pulley by means of said belt for rotation therewith.

8. The combination as set forth in claim 7 in which, the first shaft comprises a variable speed shaft, and the self-adjusting variable pitch pulley is directly responsive to changes in speed of the first shaft.

9. The combination as set forth in claim 7 in which the first pulley comprises a centrifugally operated variable pitch belt pulley.

10. The combination as set forth in claim 7 in which the second pulley comprises a fixed pitch pulley, and belt-tightening means are provided in engagement with the V-belt operative to take up slack therein as the pitch diameter of the first pulley varies.

References Cited in the file of this patent

UNITED STATES PATENTS

| | | |
|---|---|---|
| 581,286 | Heywood | Apr. 27, 1897 |
| 652,541 | Gourgoulin | June 26, 1900 |
| 1,015,481 | Draullette | Jan. 23, 1912 |
| 2,509,685 | Hughes | May 30, 1950 |
| 2,612,055 | Miner | Sept. 30, 1952 |

FOREIGN PATENTS

| | | |
|---|---|---|
| 1,067,204 | France | June 14, 1954 |